June 16, 1942. T. GRISWOLD, JR 2,286,615
FLEXIBLE SUSPENSION
Filed Sept. 21, 1940  2 Sheets-Sheet 1
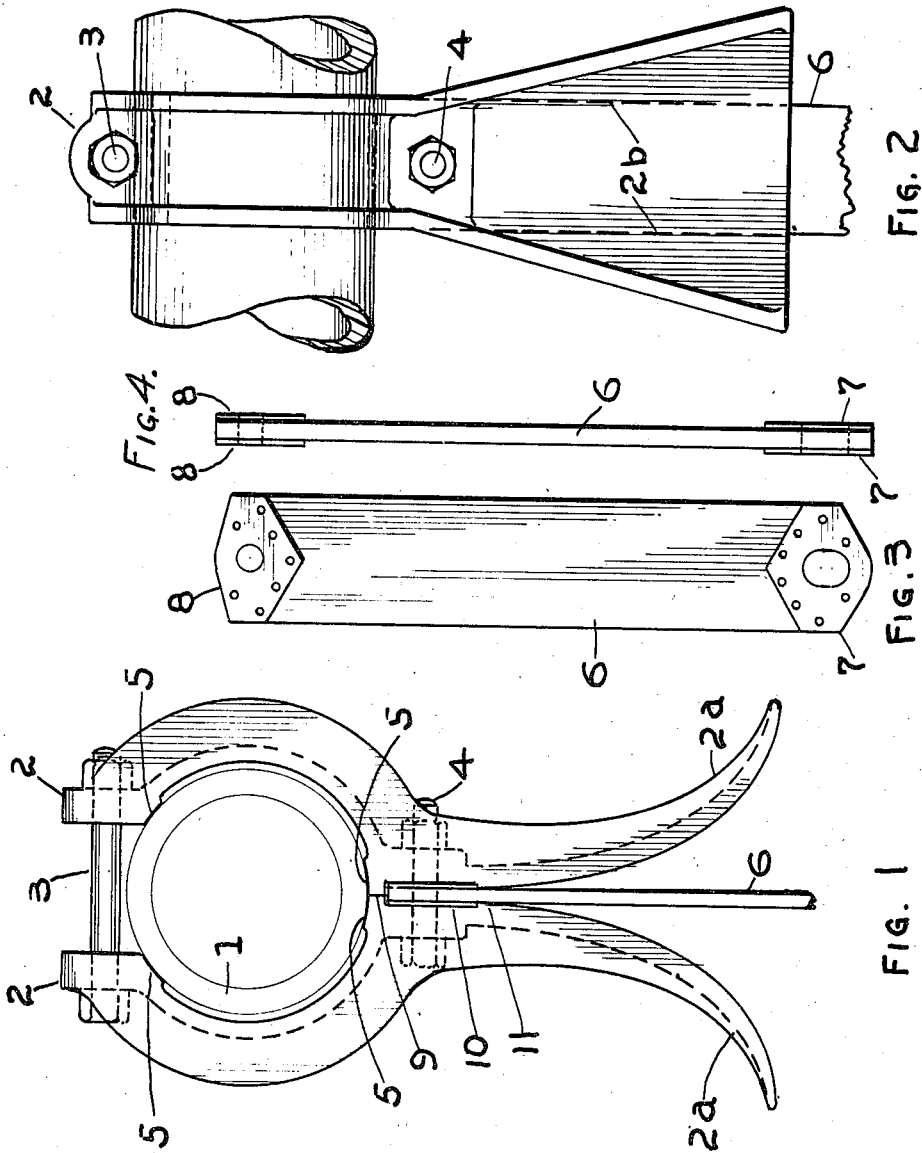
INVENTOR
Thomas Griswold Jr.
BY

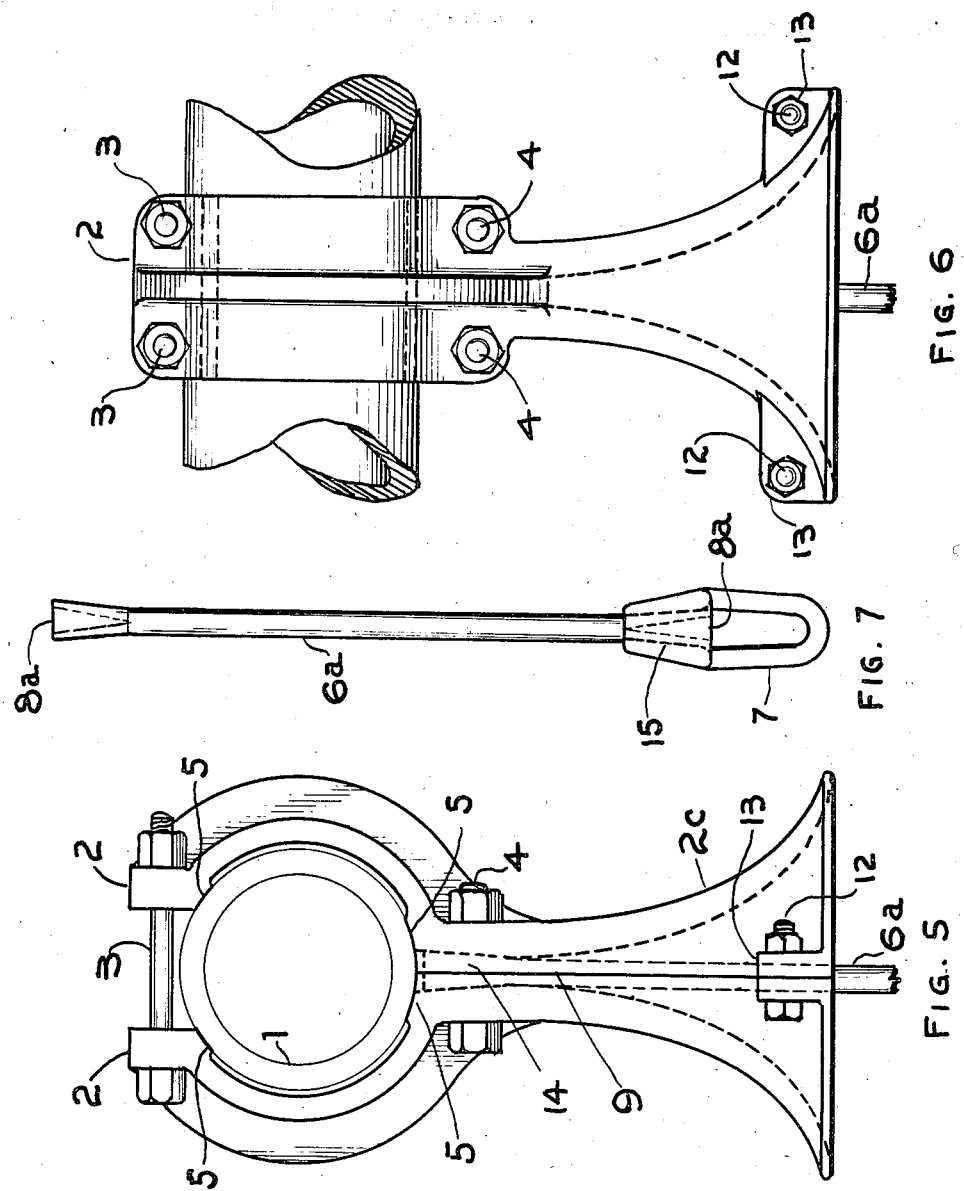

Patented June 16, 1942

2,286,615

UNITED STATES PATENT OFFICE 2,286,615

FLEXIBLE SUSPENSION

Thomas Griswold, Jr., Midland, Mich.

Application September 21, 1940, Serial No. 357,634

4 Claims. (Cl. 248—54)

My invention concerns flexible suspensions for swingable objects, e. g. means for attaching the supporting rope or other tension member of a swing to the support therefor. It concerns more particularly a form of suspension in which there is no hinge pin subject to rubbing, nor are there roller bearings or other devices to lessen the friction of such a pin in the attachment. It still further concerns a form of suspension practically frictionless and squeakless, requiring no lubrication and adapted, among other uses, for the flexible connection of playground swings to their overhead supports.

It has been found by experience that hinged suspensions, in which there is a pin, deteriorate with wear, introduce appreciable friction whereby the swing is retarded, and squeak objectionably unless oiled. The objections to such a method of hanging a swing have been overcome in part by the introduction of roller bearings for the pins. Such construction constitutes an improvement over the pin hinge form, but such suspensions are elaborate and costly. They operate in one plane only and side swing must be accommodated by sliding of chain links, clevises, clevis pins, or other joints in the flexible continuation of the swing rope up to the roller bearing in the suspension.

I have developed a novel form of suspension particularly suited, among other applications, for use in connecting side ropes of swings in playgrounds to the overhead supports, but generally adaptable to any and all uses where one object is to be swung while attached to another. This device comprises a flexible member such as a rope, strap or chain attachable to the swingable object, e. g. to the upper end of the side rope of a swing, the flexible member being held in a hanger adapted to grasp the upper end of the flexible member and the overhead supporting structure, e. g. a pipe support. In some of various forms of the invention the flexible member may be a strap which may be grasped by the hanger so as to be held rigid at the point so grasped, limiting the portion not so grasped, to a swinging motion to-and-fro in one plane only, or it may be clasped in an articulated manner as by means of a pin through a suitable hole in the strap which will permit the strap to swing sidewise as well as to-and-fro. The hanger which holds the strap will be provided with outwardly flaring curved skirts upon the surfaces of which the strap may wrap and unwrap as it swings back and forth under load. These curved skirts reduce the bending stress upon the strap to a low value and insure it a long life.

I will now describe my invention in several forms, all forms adaptable for use on playground swings, and I have illustrated my invention by seven figures in the accompanying drawings.

Referring now to the drawings:

Fig. 1 is a side view of an assembled suspension. Fig. 2 is a front view thereof. Fig. 3 is a side view of a strap. Fig. 4 is an edge view thereof. Fig. 5 is a side view of an alternative form of suspension. Fig. 6 is a face view of Fig. 5. Fig. 7 is a side view of the flexible member of the suspension shown in Figs. 5 and 6.

In Figs. 1 and 2 the strap is shown broken to reduce the height of the figure. In Figs. 3 and 4 the strap is shown full length as required for application. In Figs. 5 and 6 the flexible member is cut off to reduce height of the figure. In Fig. 7 the flexible member is shown full length. Similar reference figures will be used for like parts in all figures.

In the drawings, 1 represents a conventional horizontal pipe support for playgroupnd swings. Each side rope suspension here shown comprises a pair of identical clamp members 2 held in clamping relation upon the pipe 1 by the clamp bolts 3 and 4 which bring the members 2 into gripping contact with the pipe surface, preferably at restricted lands 5. The clamping members 2 are flared out into arc-like skirts 2a. Between the members 2 and pierced by the bolt 4 is the flexible member, shown here as a strap 6. The strap may be made of any suitable flexible material such as woven wire, fiber such as cotton cord or duck impregnated with rubber or other suitable compound, or the strap may be a flexible synthetic resin or compound having suitable strength, flexibility, and durability. I have found that a piece of impregnated cotton belting makes a very satisfactory and durable strap for a playground swing suspension. For such a strap I prefer to reinforce the two ends with metal plates applied to the two faces and secured thereto by through rivets, either with or without a bonding or cementing material. These reinforcing plates are shown in Figs. 1 to 4, inclusive, at 7 for the lower end of the strap and at 8 for the upper end thereof. The strap and its plates are perforated as shown with a hole for the through bolt 4 in the upper end and a hole in the lower end for attachment to the side rope of the swing by means of a suitable link or equivalent.

For the type of construction shown in Figs. 1 to 4, inclusive, I prefer that the clamping members 2 of the hanger shall come together at the faces 9 and shall have a recess 10 slightly wider than the overall thickness of the strap at the plates 8. I prefer further that the curvature of the flaring wings shall start substantially tangent to the strap when hanging in a vertical position. With this arrangement and the bolts 3 and 4 tightened up to securely hold the hanger to the pipe, the strap 6 will be loosely, but somewhat closely, held in the recess 10 hinged upon the bolt 4, but when the lower end of the strap is moved to-and-fro with the swing the strap will be wrapped upon the arcs of the skirts without sudden or extreme flexure at any point. The strap will also pivot on the bolt 4, if necessary, to accommodate any lateral motion of the swing without putting a sidewise bending stress upon the strap.

In use, this swing attachment is noiseless, practically frictionless, and durable. It is cheaply made, easily applied, employing but two bolts per unit.

Other modifications of structure may be made to suit various requirements and uses without departing from the spirit of my invention.

One such modification is shown in Fig. 2 by the dashed lines 2b which, for a suspension not subject to lateral motion of the swing and flexible member of the suspension, represent the limits to which the skirts may be confined, no flare of skirts being necessary.

Another modification is shown in Figs. 5 to 7, inclusive. Here the strap is replaced by a flexible rope 6a, which may be, for instance, a flexible steel or bronze wire cable. The hanger is in two identical halves as in the first description, but the flaring skirts 2c, are of half bell-shaped funnel form. Two clamping bolts may be used above and below the pipe support. The two hanger members 2c contact along the line 9, each furnishing a half of the funnel. The wire rope flexible member may be expanded at the ends as shown by tapered pins 8a to form conical enlargements. The upper conical end of the cable seats in a conical socket 14 in the hanger. The lower enlarged end seats in a corresponding conical socket 15 in the socket eye 7 adapted to connect with a side rope of a swing or with any other swingable object. Two bolts, 12, in lugs 13 serve to hold together the lips of the bell-funnel.

This form of suspension permits free lateral and to-and-fro motion without hinge pin action.

The members 2 may be conveniently made in iron, preferably malleablized iron, although other metals or material may be used.

Various types of flexible members may be used, such as thin flexible metal bands or straps, link chain, etc. The cable shown in Fig. 6 may be in the form of a loop or hair pin, if desired.

Where, in the claims, the word "skirt" or "skirts" is used, it shall be understood to mean the funnel construction and/or the flat curved construction.

I claim:

1. In a suspension of the character described, a hanger for a flexible suspension member comprising two clamp elements clampable upon a support therefor, a curved skirt extension of each said clamp element depending below the clamped assembly, the two skirts being in opposed relation to each other, and means to secure one end of a flexible suspension member in said assembly between said opposed skirts in approximate tangential relation thereto.

2. In a suspension of the character described, a hanger for a flexible suspension member comprising two clamp elements clampable upon a support therefor, a flaring curved skirt extension of each said clamp element having a half bell-shaped funnel form depending below the clamped assembly, the two skirts being in opposed relation to each other and forming in assembly a flaring bell-shaped funnel, and means to secure a flexible suspension member in said assembly between said opposed skirts in approximate tangential relation thereto.

3. A suspension for playground swings comprising a hanger for a flexible suspension member, having two clamp elements clampable upon the swing support, a curved skirt extension of each said element depending below the clamped assembly, the two skirts being in opposed relation to each other, means to secure one end of a flexible suspension member in said assembly between said opposed skirts in approximate tangential relation thereto, and means to permit fastening a swing tension member to the other end of said flexible suspension member.

4. In a suspension of the character described, a hanger for a flexible suspension strap comprising two clamp elements clampable upon a support therefor by bolt means adapted to draw said elements together to enclose said support seated upon seats therefor in said clamp elements, a flaring curved skirt extension of each said clamp element depending below the clamped assembly, the two skirts being in opposed relation to each other, and means to secure one end of a flexible strap between said so clamped elements to depend between said opposed flaring curved skirts in approximate tangential relation thereto.

THOMAS GRISWOLD, Jr.